US009053592B2

(12) United States Patent
Sato et al.

(10) Patent No.: US 9,053,592 B2
(45) Date of Patent: Jun. 9, 2015

(54) KEY MANAGEMENT BOX

(71) Applicant: TOKAI RIKEN CO., LTD., Seki-shi, Gifu-ken (JP)

(72) Inventors: Akihiro Sato, Seki (JP); Masami Umemura, Gifu (JP); Nobuhiko Segi, Ogaki (JP)

(73) Assignee: TOKAI RIKEN CO., LTD., Seki (JP)

( * ) Notice: Subject to any disclaimer, the term of this patent is extended or adjusted under 35 U.S.C. 154(b) by 227 days.

(21) Appl. No.: 13/668,950

(22) Filed: Nov. 5, 2012

(65) Prior Publication Data

US 2013/0127594 A1 May 23, 2013

(30) Foreign Application Priority Data

Nov. 23, 2011 (JP) ................................ 2011-255617

(51) Int. Cl.

| | |
|---|---|
| ***H04Q 9/00*** | (2006.01) |
| ***G08B 13/14*** | (2006.01) |
| ***G06F 7/04*** | (2006.01) |
| ***G07C 9/00*** | (2006.01) |
| ***A47G 29/10*** | (2006.01) |
| ***E05B 47/00*** | (2006.01) |
| *E05B 65/44* | (2006.01) |
| *E05B 65/46* | (2006.01) |

(52) U.S. Cl.
CPC ............ *G07C 9/00896* (2013.01); *A47G 29/10* (2013.01); *E05B 47/00* (2013.01); *E05B 65/44* (2013.01); *E05B 65/46* (2013.01)

(58) Field of Classification Search
CPC ........................................................ G06F 7/04
USPC .............. 340/5.23, 5.73, 5.61, 426.35, 539.1, 340/572.1, 10.1; 707/100
See application file for complete search history.

(56) References Cited

U.S. PATENT DOCUMENTS 4,673,915 A * 6/1987 Cobb ............................ 340/330
4,839,875 A * 6/1989 Kuriyama et al. .............. 369/14
5,940,001 A * 8/1999 Okayasu et al. ............. 340/5.64

(Continued)

FOREIGN PATENT DOCUMENTS

JP A-2005-139789 6/2005
WO WO 98/24006 A2 6/1998

(Continued)

OTHER PUBLICATIONS

Apr. 8, 2013 Extended European Search Report issued in European Application No. 12191683.7.

*Primary Examiner* — Nam V Nguyen
(74) *Attorney, Agent, or Firm* — Oliff PLC

(57) ABSTRACT

A key management box includes a card reader configured to read ID for personal authentication, a data writing unit to write information on at least the ID read by the card reader in an electronic key, a data erasing unit configured to communication with the electronic key and disable the electronic key when the electronic key is determined to be a key on-lending, and a control substrate configured to determine that a lending mode is established when the card reader reads the ID and cause an electronic lock to permit opening/closing of a door and then activate the data writing unit, or configured to cause the electronic lock to permit opening/closing of the door when the data erasing unit determines that the electronic key is a key on-lending through communication with the electronic key while the card reader does not read ID.

18 Claims, 9 Drawing Sheets

(56) References Cited

U.S. PATENT DOCUMENTS

| | | | | |
|---|---|---|---|---|
| 6,157,315 | A * | 12/2000 | Kokubo et al. | 340/5.42 |
| 6,431,438 | B1 * | 8/2002 | Pires et al. | 235/375 |
| 6,456,900 | B1 * | 9/2002 | Kakuta | 700/233 |
| 6,693,539 | B2 * | 2/2004 | Bowers et al. | 340/572.1 |
| 6,737,961 | B2 * | 5/2004 | Flick | 340/426.35 |
| 7,042,334 | B2 * | 5/2006 | Mosgrove et al. | 340/5.73 |
| 7,046,145 | B2 * | 5/2006 | Maloney | 340/568.1 |
| 7,336,174 | B1 * | 2/2008 | Maloney | 340/572.1 |
| 8,648,693 | B2 * | 2/2014 | Tsuruta | 340/5.1 |
| 2010/0109837 | A1 | 5/2010 | Sato et al. | |

FOREIGN PATENT DOCUMENTS

| | | | |
|---|---|---|---|
| WO | WO 2008/130000 | A1 | 10/2008 |
| WO | WO 01/75811 | A1 | 10/2011 |

* cited by examiner

KEY MANAGEMENT BOX

CROSS-REFERENCE TO RELATED APPLICATIONS

This application is based upon and claims the benefit of priority from each of the prior Japanese Patent Application No. 2011-255617 filed on Nov. 23, 2011, the entire contents of which are incorporated herein by reference.

BACKGROUND OF THE INVENTION

1. Field of the Invention

The present invention relates to a key management box or cabinet for collectively managing electronic keys to be used by users to unlock the locks of office furniture.

2. Description of Related Art

In offices (work or support spaces of companies and the like used for conventional office activities such as writing, filing, and storage work), dedicated keys for opening and closing filing or storage cabinets respectively are heretofore stored or deposited in a key management box. In borrowing or using one or some of the keys, a user (e.g., an office worker) opens a door of the key management box by ID authentication using for example an ID card of the user and takes out the key(s) of the storage cabinet(s) the user intends to utilize (open). At that time, the key management box authenticates the user ID from his/her ID card and allows the door to be opened only when the user has the authority of access to the target storage cabinet(s).

If many storage cabinets are to be utilized in sequence to check or take out documents stored therein, a user has to move to the cabinets while carrying many keys for the storage cabinets at a time. This results in poor workability. To solve this disadvantage, a system configured to open and close a plurality of storage cabinets by use of a single key has been desired.

Such a system to open and close two or more storage cabinets by a single key is disclosed in for example Patent Document 1. In this document, electronic keys each including an IC chip and two terminals connected to the IC chip are collectively managed in a key management box. When personal authentication is successfully executed, the key management box causes the contact IC chip to store storage cabinet identifying data to specify two or more storage cabinets which the user has access to. When the user moves to the storage cabinet and inserts the electronic key in a lock of the storage cabinet, this storage cabinet reads the storage cabinet identifying data from the IC chip and determines whether or not the user has the authority of access to that cabinet. If the access right is authenticated, this cabinet unlocks the lock to allow opening and closing of the door. If the access right is not authenticated, on the other hand, the cabinet remains the lock unlocked to disallow opening and closing of the door. Accordingly, the user is allowed to open and close only the storage cabinet accessible by the user to check or take out any documents stored in that cabinet. In the case where storage cabinet identifying data for two or more storage cabinets accessible by a user is stored in the contact IC chip of the electronic key, the user is permitted to open and close the cabinets by the single electronic key to check or take out any documents.

Normally, one electronic key for opening and closing a plurality of storage cabinets is used only for a short time per day. In case such electronic keys are assigned one by one to users (office workers), the key management box has to manage the electronic keys to the number corresponding to the number of persons who may use the keys, and thus needs redundant space. The key management box disclosed in Patent Document 1 is therefore configured such that the contact IC chip of the electronic key stores ID data to identify a user in addition to the storage cabinet identifying data. According to the above key management box, the electronic key in which ID data is stored in the contact IC chip is used as a specified key assigned to the user corresponding to the ID data. This allows shared use of a single key among a plurality of persons. The number of electronic keys to be managed by the key management box is reduced, resulting in space saving.

RELATED ART DOCUMENT

Patent Document

Patent Document 1: WO 2008/130000

SUMMARY OF INVENTION

Problems to be Solved by the Invention

However, the conventional key management box is provided with Read/Write units in one-to-one correspondence to electronic keys to write and erase the ID data and the storage cabinet identifying data in and from the contact IC chips. Thus, this key management box is high in cost.

On the other hand, under a Private Information Protection Law in Japan, for example, tight security management is demanded in offices. Thus, easy lowering a security level for cost reduction is undesirable.

The present invention has been made to solve the above problems and has a purpose to provide a key management box capable of ensuring high security with reduced cost.

Means of Solving the Problems

To achieve the above purpose, one aspect of the invention provides a key management box for collectively storing and managing electronic keys each including an IC chip from/on which data is readable/writable, each electronic key being to be used by a user to unlock one or more locks of storage cabinets placed in an office, the key management box comprising: a main body for housing the electronic keys; a door attached in openable and closable manner to the main body to cover the electronic keys; opening/closing permission means for permitting opening/closing of the door; a plurality of electronic-key holding means attached to the main body and covered by the door and configured to individually hold the electronic keys; personal authentication means provided on outside of the main body and configured to read personal identification information to perform personal authentication; data writing means configured to specify at least the personal identification information read by the personal authentication means and write information for identifying a person in the IC chip; electronic-key disabling means provided on the outside of the main body and configured to communicate with the IC chip of one of the electronic keys and disable the one electronic key when this key is determined to be an electronic key on-lending; and control means configured to determine that a lending mode is established to allow lending of the electronic key when the personal authentication means reads the personal identification information, and cause the opening/closing permission means to permit opening/closing of the door and then activate the data writing means, or to determine that a returning mode is established to allow returning of the electronic key when the electronic-key disabling means communicates with the IC chip and detects that the electronic key is a key on-lending while the personal authentication means does not read the personal identification information, and cause the opening/closing permission means to permit opening/closing of the door.

Advantageous Effects of Invention

According to the present invention having the above configuration, the data writing means and the electronic-key disabling means can be shared by a plurality of electronic keys. Cost reduction can therefore be achieved. The key management box is arranged such that the personal authentication means provided on the outside of the main body reads the personal identification information and determines that the lending mode is established to allow lending of the electronic key, permits opening of the door, and then writes the personal identification information in the electronic key. On the other hand, the key management box is also arranged such that, while the personal authentication means does not read the personal identification information, the electronic-key disabling means establishes communication with the IC chip of the electronic key and determines that the electronic key is an electronic key on-lending, and thereby determines that the returning mode for returning the electronic key is established, and permits opening of the door. Thus, after the electronic key is reliably disabled when the electronic key is returned, the electronic key is allowed to be returned to the electronic-key holding means. Security of the key management box can be ensured accordingly.

DESCRIPTION OF EMBODIMENTS

A detailed description of a preferred embodiment of a key management box embodying the present invention will now be given referring to the accompanying drawings.

<First Embodiment>

(Schematic Configuration of Key Management Box)

Figure 1:
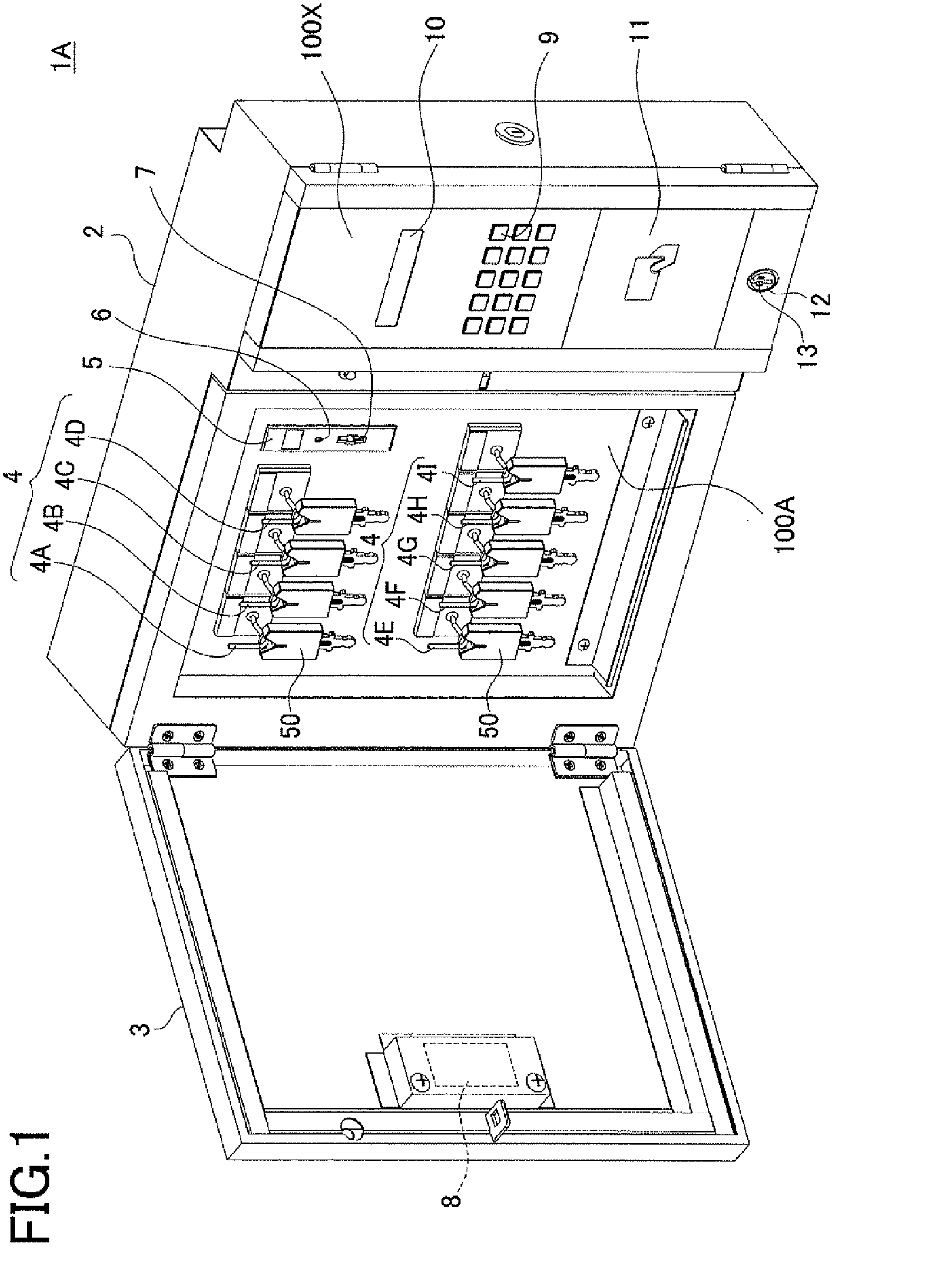
FIG. 1 is an external perspective view of a key management box with a door opened in a first embodiment of the invention.
Figure 2:
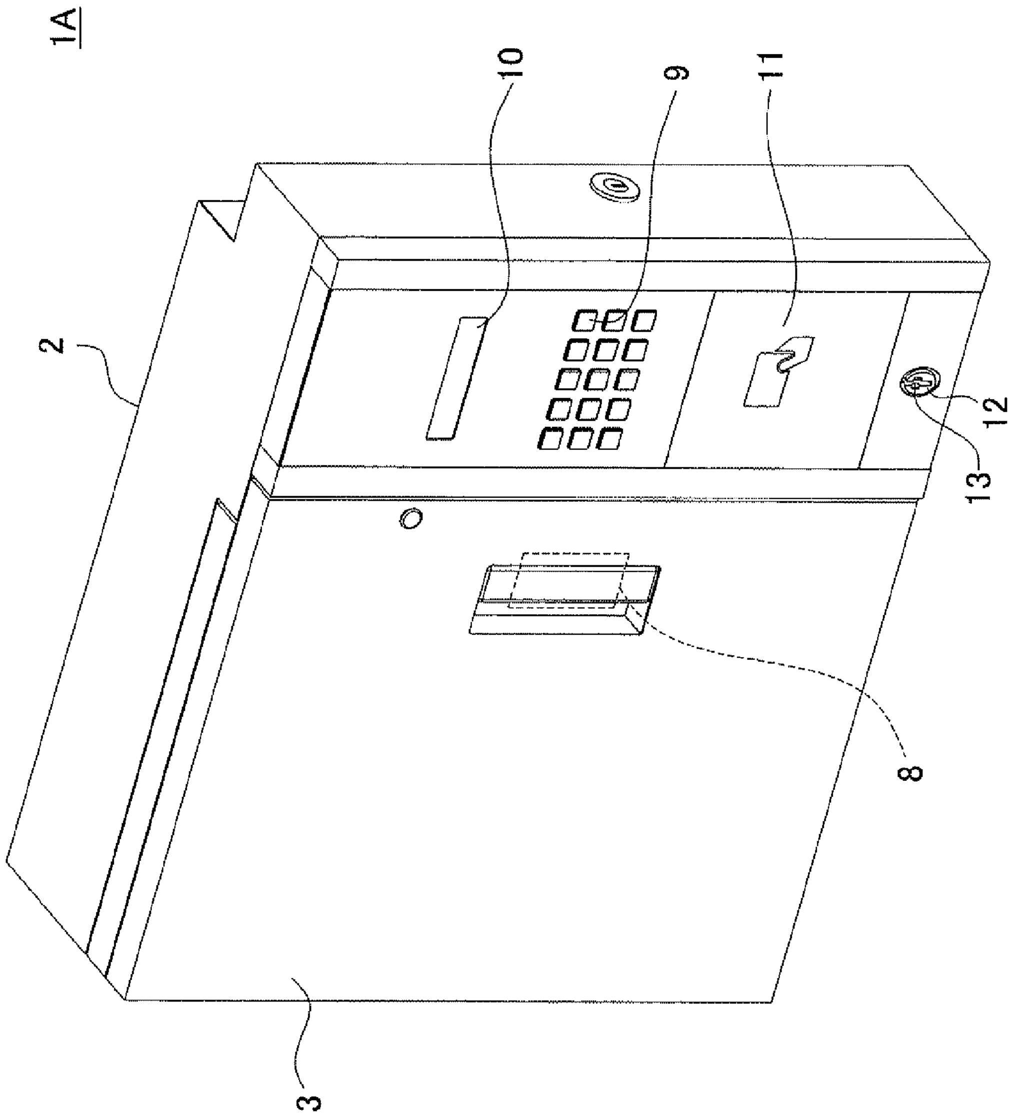
FIG. 2 is an external perspective view of the key management box with the door closed in the first embodiment.

FIG. 1 is an external perspective view of a key management box 1A with a door 3 opened in the first embodiment of the invention. FIG. 2 is an external perspective view of the key management box 1A with the door 3 closed.

The key management box 1A shown in FIGS. 1 and 2 is arranged to collectively manage electronic keys 50 to be used by users (e.g., office workers) in order to unlock a storage cabinet or cabinets installed in an office (work or support spaces of companies and the like used for office activities such as writing, filing, and storage work). In the key management box 1A, the door 3 is attached to a main body 2 and locked or unlocked with an electronic lock 8.

Figure 3:
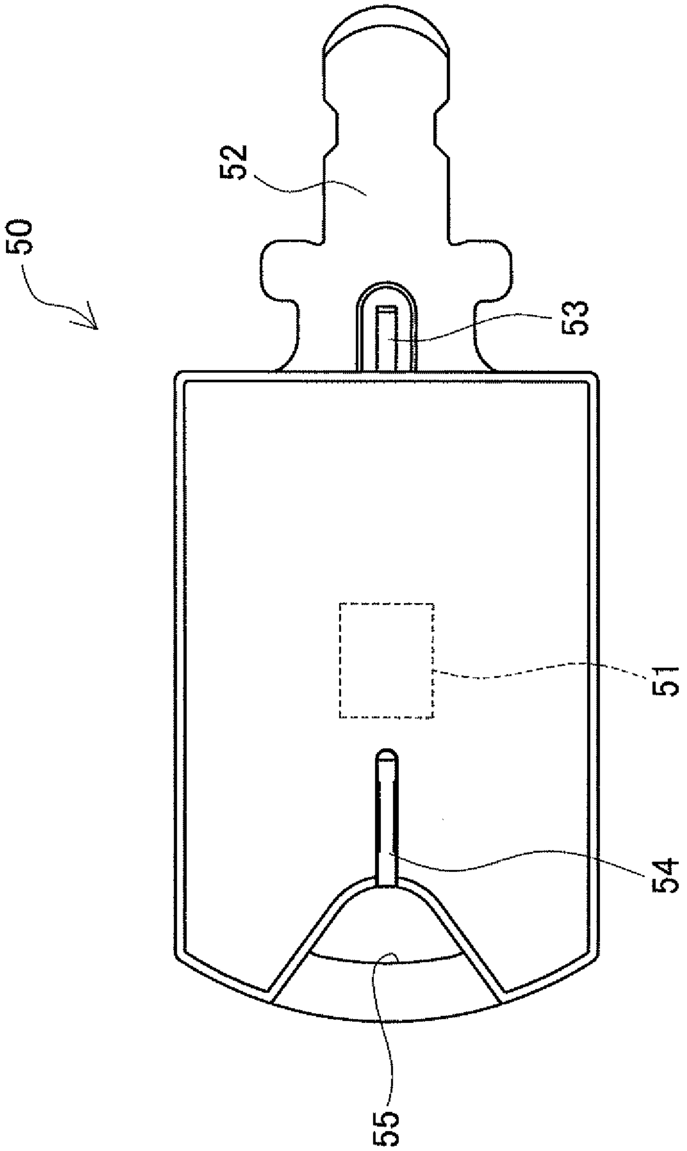
FIG. 3 is a plan view of an electronic key to be managed in the key management box in the first embodiment.

FIG. 3 is a plan view of the electronic key 50. This electronic key 50 includes a built-in contact IC chip 51 (hereinafter, also simply referred to as an "IC chip 51") configured to read and write data. The IC chip 51 is connected to a first terminal 52 and a second terminal 53. The electronic key 50 is provided with an indication light 54. Each electronic key 50 is formed with a hole 55 for holder (also referred to as a "holder hole").

As shown in FIG. 1, in a key storing section 100A formed on the inside of the main body 2 to be covered by the door 3, a plurality of electronic-key holders 4, and a single data-writing unit 5 are provided. In the present embodiment, nine electronic-key holders 4 each having a hook-like shape are provided with different reference signs for convenience shake, that is, as upper holders 4A, 4B, 4C, and 4D arranged in the order from left to right and lower holders 4E, 4F, 4G 4H, and 4I arranged in the order from left to right. The electronic keys 50 are stored as hanging from the holders 4 so that the holders 4 are inserted in the holder holes 55. The door 3 is attached to the main body 2 to cover the holders 4A to 4I and the data writing unit 5.

The data writing unit 5 is placed in the main body 2 so that an insert port 7 in which one of the electronic keys 50 is to be inserted appears on the inside (the key storing section 100A) of the main body 2 when the door 3 is opened. The data writing unit 5 is electrically connected to the first terminal 52 and the second terminal 53 of the electronic key 50 inserted in the port 7 to write data in the IC chip 51. The data writing unit 5 is provided with an indication lamp 6 appears on the inside (the key storing section 100A) of the main body 2. The data writing unit 5 is configured to change the lighting condition (pattern) of the lamp 6 to inform a user, for example, that writing data in the first and second terminals 52 and 53 is normally in execution and that the data writing unit 5 is not in proper contact with the first and second terminals 52 and 53.

On the outside (a front side 100X) of the main body 2 not covered with the door 3, there are arranged a numerical keypad 9 including keys to be operated to enter data, an indicator 10 to display the data input in the keypad 9, messages, etc., and a non-contact card reader 11 to read ID through wireless communication with an ID card.

The main body 2 further includes a data erasing unit 12 having an insert port 13 in which the electronic key 50 is inserted, the port 13 being exposed to the outside. When the data erasing unit 12 is electrically connected to the first and second terminals 52 and 53 of the key 50 inserted in the port 13, this unit 12 erases the data stored in the IC chip 51 to disable or invalidate the key 50.

(Electrical Block Configuration)

Figure 4:
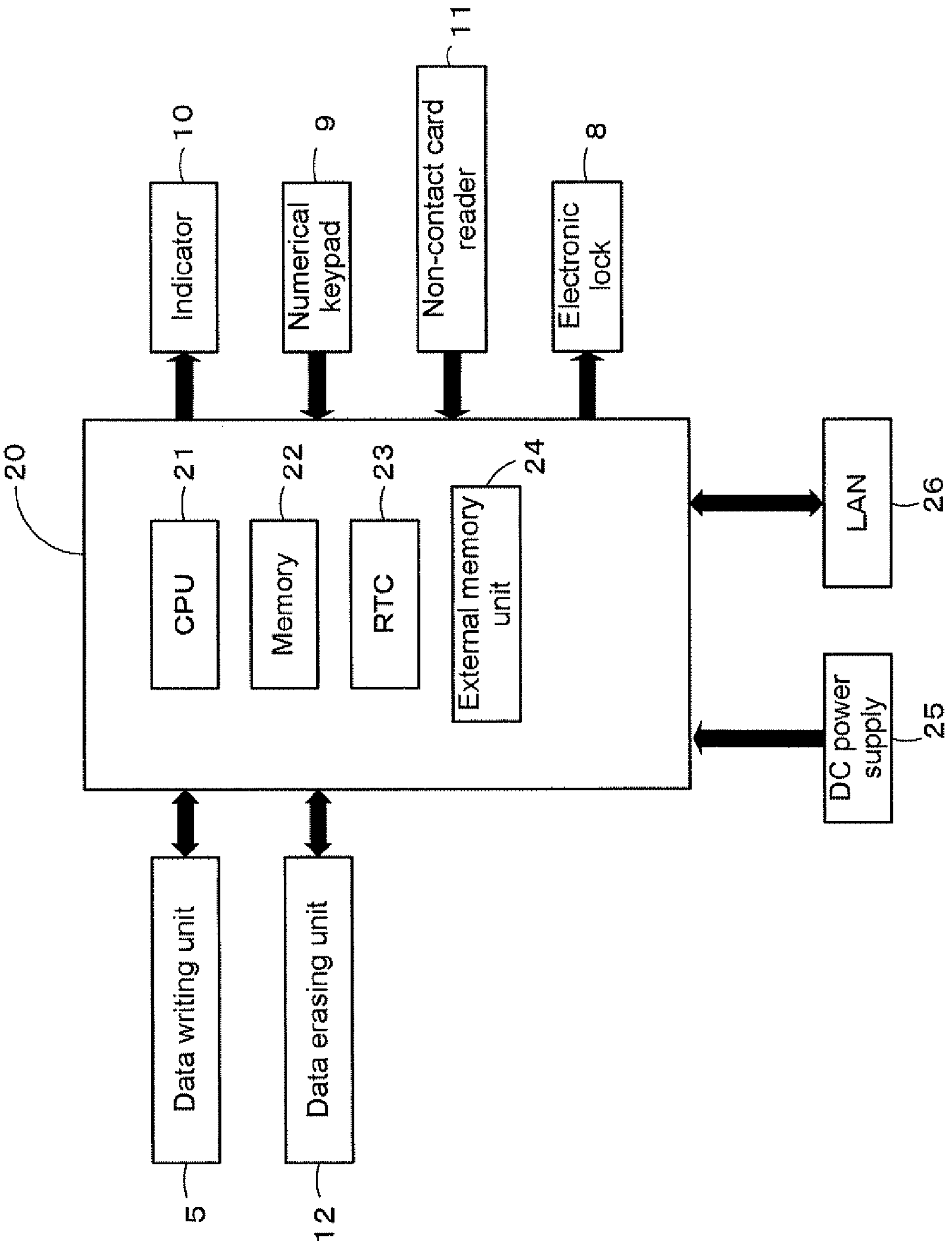
FIG. 4 is an electrical block diagram of the key management box in the first embodiment.

FIG. 4 is an electrical block diagram. On a control substrate 20, there are mounted a CPU 21 to carry out processing and calculating of the data, a memory 22 to read and write data, an RTC (Real Time Clock) 23 for timing, an external memory unit 24 such as an SD card, and others. The control substrate 20 is connected to a DC power supply 25 and is driven when supplied with electric power therefrom. The control substrate 20 is also connected to a higher-level device (not shown) through a LAN 26 to transmit/receive data.

The memory 22 stores for example "ID" (one example of personal identification information) to identify a user, "storage cabinet identifying data" to identify a storage cabinet to which the user has access from among a plurality of storage cabinets, and other data.

The external memory unit 24 stores for example a usage history of the key management box 1A (data on date and time and a user to which an electronic key 50 was lent or is being lent, data on date and time and a user from which the electronic key 50 was returned, etc.).

The data stored in the memory 22 and the external memory unit 24 may be updated by data appropriately received from the higher-level device through the LAN 26. The data also may be read and updated in a special machine by an administrator who comes to the key management box 1A at regular intervals.

The control substrate 20 is connected to the data writing unit 5, the data erasing unit 12, the numerical keypad 9, the indicator 10, the non-contact card reader 11, the electronic lock 8, and others to control operations of the key management box 1A.

(Storage Cabinet System)

Figure 6:
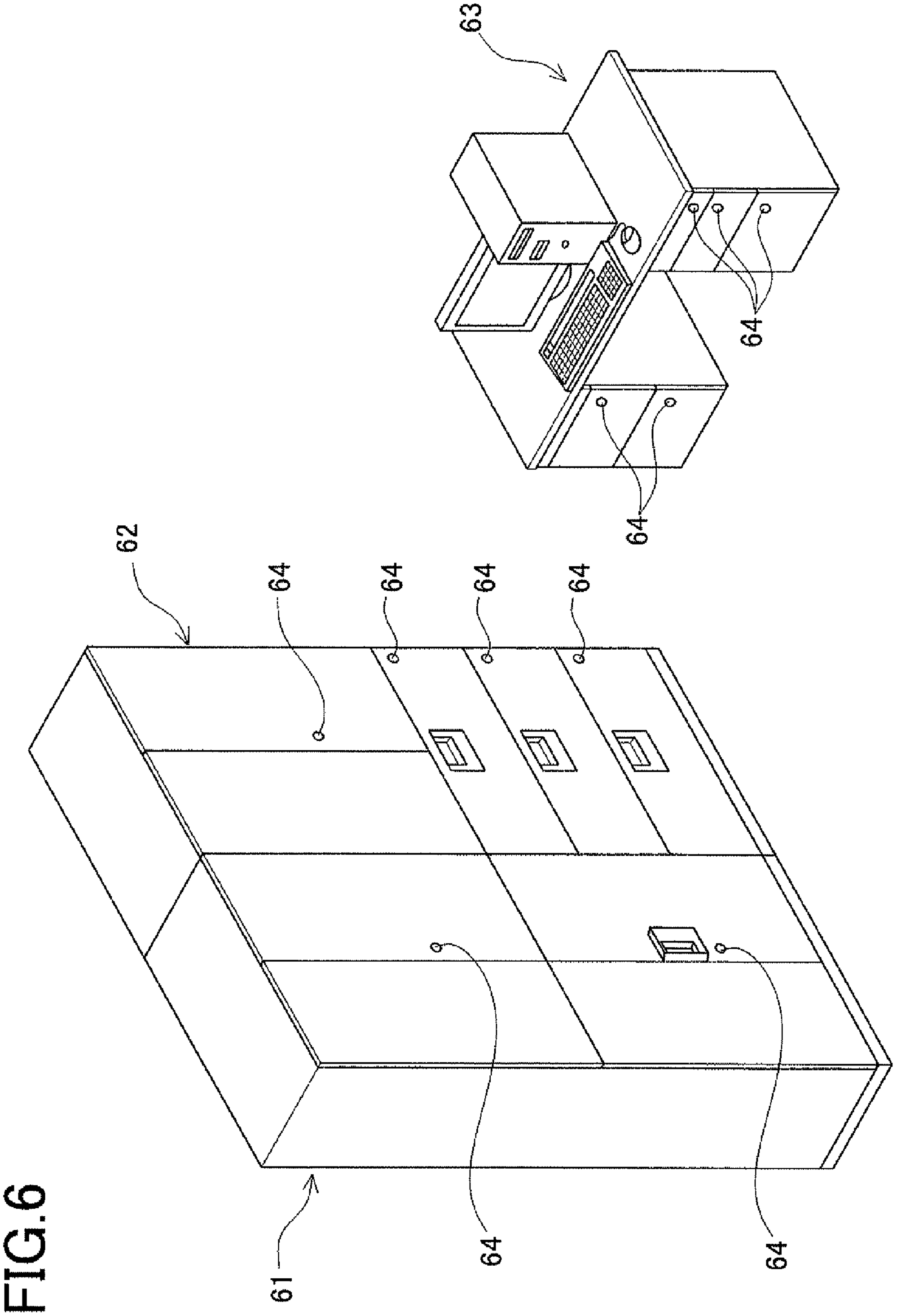
FIG. 6 is a perspective view showing one example of storage cabinets installed in an office.

The following description shows one example of a storage cabinet system configured to unlock two or more storage cabinets by use of a single electronic key 50 configured as above. FIG. 6 is a perspective view showing one example of storage cabinets installed in an office.

In the office, objects to be stored such as documents, files, CD-ROMs, USB memories, and personal computers are stored for example in shelves and drawers of storage cabinets 61 and 62, drawers of an office desk 63. The doors of the storage cabinets 61 and 62 and the drawers of the storage cabinet 62 and the desk 63 are individually provided with electronic locks 64.

In the storage cabinet system, ID is read from an electronic key 50 inserted in an electronic lock 64 to carry out personal authentication of a user. If the personal authentication is successfully executed, it is determined whether or not the user has the authority of access to target storage cabinets based on the storage cabinet identifying data read from the electronic key 50. If the user has the access authority to the target storage cabinets, the electronic locks 64 of the storage cabinets are unlocked to permit opening/closing of relevant door(s) and/or drawer(s), i.e., the doors of the storage cabinets 61 and 62 and the drawers of the desk 63. On the other hand, if the user has no access authority to the storage cabinets, the electronic locks 64 are not unlocked to disallow opening/closing of the doors of the storage cabinets 61 and 62 and the drawers of the desk 63.

(Opening/Closing Control of Key Management Box)

Figure 5:
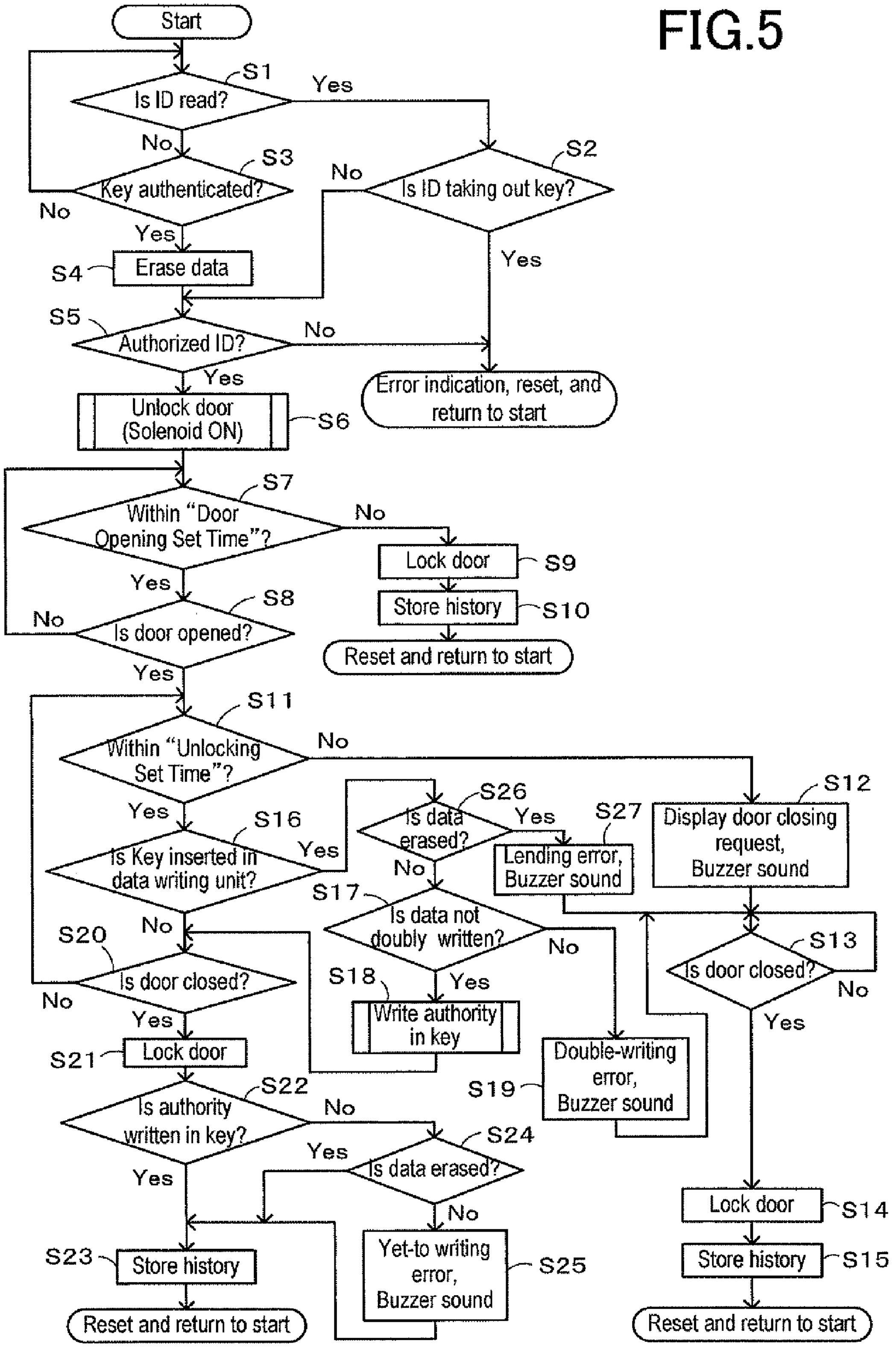
FIG. 5 is a flowchart showing opening/closing control operations of the key management box in the first embodiment.

The following explanation is given to opening/closing control operations of the key management box 1A. FIG. 5 is a flowchart showing the opening/closing control operations of the key management box 1A.

The CPU 21 first determines at step (hereinafter referred to as "S") 1 whether or not the non-contact card reader 11 reads ID of an ID card to check whether or not a user has an intention to borrow an electronic key 50.

If the ID is not read by the card reader 11 (S1:No), it is determined at S3 whether or not the electronic key 50 is authenticated. To be concrete, this determination is made in such a manner that the data erasing unit 12 electrically communicates with the electronic key 50 and determines whether or not the target key 50 is an electronic key 50 on-lending. If the key 50 is not authenticated, the program returns to S1. In other words, the key management box 1A checks reading of ID and authentication of an electronic key 50 at regular intervals.

If ID is read by the card reader 11 (S1:Yes), the user is considered to have an intention to borrow an electronic key 50. Thus, the CPU 21 determines that a lending mode to allow lending of an electronic key 50 is established and then determines at S2 whether or not the ID (the user) is currently taking out one electronic key 50. This determination is made to check if two or more electronic keys 50 are lent to one user. Specifically, whether or not one key 50 is still lent under the ID is determined based on whether or not the ID read by the card reader 11 coincides with the ID of the user to which the key 50 is on-lending by retrieving the usage history stored in the external memory unit 24.

If the ID read by the card reader 11 coincides with the ID of the user to which the key 50 is on-lending and it is determined that The ID is taking out the key 50 (S2:Yes), the CPU 21 displays an error indication on the indicator 10, and resets the program, returning to Start and entering standby. The error indication informs the user that the key management box 1A manages which user has the electronic key 50 now (on-lending), thereby preventing unauthorized or malicious use of an electronic key 50.

In contrast, if the read ID does not coincide with the user ID under which the electronic key 50 is being lent, the CPU 21 determines that the read ID is different from the ID taking out the key 50. In this case (S2:No), indicating that any electronic key 50 is not being lent to the user, the program advances to S5.

If the card reader 11 does not read any ID (S1:No) and the data erasing unit 12 authenticates the electronic key 50 (S3: Yes), the CPU 21 determines that a returning mode to allow returning of the electronic key 50 is established and, at S4, erases the data stored in the contact IC chip 51 of the key 50 inserted in the port 13 of the data erasing unit 12 to disable the key 50. This disabled key 50 is a blank electronic key assignable (i.e., to be enabled or validated) to anyone. Thereafter, the program advances to S5.

At S5, the CPU 21 determines whether or not the read ID is an authorized ID. To be concrete, in the lending mode, this determination is carried out by determining whether or not the ID read by the card reader 11 coincides with the ID stored in the memory 22. In the returning mode, on the other hand, the determination is conducted by determining whether or not the ID read by the data erasing unit 12 from the IC chip 51 of the electronic key 50 coincides with the ID stored in the memory 22. In this way, a determination whether or not the user subjected to ID authentication has the authority of access to the target storage cabinet(s).

If the read ID does not coincide with the ID stored in the memory 22 (S5:No), indicating that the user is not permitted to access the storage cabinet(s), the CPU 21 displays an error indication on the indicator 10, and resets the program, returning to Start and entering standby.

If the read ID coincides with the ID of the user authenticated to use an electronic key 50 (S5:Yes), indicating that the user has the authority of access to the storage cabinet(s), the program advances to S6 in which a solenoid of the electronic lock 8 is energized to unlock the door 3.

At S7, it is determined whether or not it is within a "door opening set time" defining a time limit from unlocking to opening of the door 3 based on an elapsed time counted by the RTC 23 activated simultaneously with unlocking of the door 3. For instance, in the case where all the electronic keys 50 are on-lending or a user no longer needs to take out any documents because of emergency contact or other reasons, the user is likely to leave the key management box 1A without taking out an electronic key 50 even though the door 3 is unlocked.

If it is out of the "door opening set time" (the "door opening set time" has elapsed) (S7:No), the door 3 is locked with the electronic lock 8 at S9 to disallow taking-out of the electronic keys 50. At S10, the CPU 21 associates the time at which the door 3 is unlocked to the authenticated ID and stores this timing as the usage history of the key management box 1A in the external memory unit 24. Accordingly, by following the data in the external memory unit 24, it is possible to specify the user who did not open the door 3 even though his/her ID was authenticated. The CPU 21 then resets the program, returning to Start and entering standby.

If it is within the "door opening set time" (the "door opening set time" has not elapsed yet) (S7:Yes), it is determined at S8 whether or not the unlocked door 3 is opened. That is, it is determined whether or not the user opens the door 3 to take out (borrow) or return an electronic key 50. If the door 3 is not opened (S8:No), the CPU 21 waits until the door 3 is opened under the condition that it is within the "door opening set time".

When the door 3 is opened within the "door opening set time" (S8:Yes), it is determined at S11 whether or not it is within an "unlocking set time" defining a time limit from unlocking to closing of the door 3 based on the elapsed time counted by the RTC 23. This is to disallow free opening/closing of the door 3 to prevent improper taking-out of any electronic key 50. While the door 3 is opened, the CPU 21 preferably causes the indicator 10 to indicate that the lending mode is running during the lending mode or the returning mode is running during the returning mode. This is to make a user aware of a lending operation or a returning operation for an electronic key 50 to easily handle the key management box 1A.

If it is out of the "unlocking set time" (the "unlocking set time" has elapsed) (S11:No), at S12, the CPU 21 causes the indicator 10 to indicate a door closing request or announcement to urge the user to close the door 3 and also generates a buzzer sound. This informs the user that the door 3 remains opened beyond the "unlocking set time" and urges the user to close the door 3 promptly. It is therefore possible to reduce the time for which the electronic keys 50 are endangered to be improperly taken out. At S13, it is then determined whether or not the door 3 is closed. When the door 3 is closed (S13:Yes), the door 3 is locked at S14 and then the date and time when the door 3 was opened is stored, in association with the read ID, as the usage history in the external memory unit 24. Accordingly, in case the electronic key(s) 50 is lost, for example, following the data in the external memory unit 24 enables identification of a user who opened the door 3 for an unreasonably long period, so that the user is brought to account.

If the door 3 is opened within the "unlocking set time" (the "unlocking set time" has not passed yet) (S11:Yes), it is determined at S16 whether or not the electronic key 50 is inserted in the port 7 of the data writing unit 5. This determination is carried out by checking whether or not the data writing unit 5 is in contact with the first and second terminals 52 and 53 of the key 50 so that the data is written in the contact IC chip 51.

When the electronic key 50 is inserted in the data writing unit 5 (S16:Yes), it is determined at S26 whether or not data is erased. This is made to prevent any possibility of improper writing of access authority in the electronic key 50 inserted in the data writing unit 5 and taking-out of the key 50 while the door 3 is opened to return the key 50. In the case where the data was erased in the process at S4, it is considered that the electronic key 50 is inserted in the data writing unit 5 even though the returning mode is running, and thus the user may intend to take out the electronic key 50 improperly. At S27, therefore, the indicator 10 indicates a lending error and a buzzer sound is generated. Thereby, the user recognizes that he/she is not permitted to take out the electronic key 50. The indication of lending error and the buzzer sound continue until the door 3 is closed (S13:No). When detects the door 3 is closed (S13:Yes), the CPU 21 causes the electronic lock 8 to lock the door 3 at S14. At S15, the date and time when the door 3 was opened and the fact that the user attempted to take out the electronic key 50 at the time of returning of the electronic key 50 are written as the usage history in the external memory unit 24 in association with the authenticated ID. The program is reset and returned to Start, entering standby.

When data is not erased in the processing at S4 (S26:No), indicating that the electronic key 50 is inserted in the data writing unit 5 during execution of the lending mode, it is considered that the user intends to properly borrow an electronic key 50. At S17, therefore, it is determined whether or not ID and storage cabinet identifying data are written doubly in the IC chip 51 of the electronic key 50. This determination is conducted to prevent any possibility that the user writes authentication in a first electronic key 50 and then in a second electronic key 50 to create and take out two specified keys 50.

If no data is written doubly (S17:Yes), at S18, the CPU 21 writes authority (ID read at S1 and storage cabinet identifying data that identifies a storage cabinet(s) which the ID-authenticated user has access to) in the IC chip 51 of the electronic key 50. In this way, the electronic key 50 is provided as a specified key assigned to the ID-authenticated user. Thereafter, the program advances to S20 in which it is determined whether or not the door 3 is closed.

In case ID and the storage cabinet identifying data are written doubly (S17:No), at S19, a double-writing error is indicated on the indicator 10 and a buzzer sound is generated. This can prevent the user from writing authority in two electronic keys 50 and taking out them. It is then determined at S13 whether or not the door 3 is closed. When the door 3 is closed (S13:Yes), the door 3 is locked at S14 and, at S15, the date and time when the door 3 was opened and that the authority was doubly written in the electronic key 50 are written as the usage history in the external memory unit 24 in association with the authenticated ID. The program is then reset and returned to Start, entering standby.

When the electronic key 50 is not inserted in the port 7 of the data writing unit 5 (S16:No), on the other hand, it is determined at S20 whether or not the door 3 is closed. While the door 3 is not closed (S20:No), it is determined whether or not it is within the "unlocking set time" and whether or not the electronic key 50 is inserted in the data writing unit 5 (S11, S12).

When the door 3 is closed (S20:Yes), the door 3 is locked at S21. At S22, it is determined whether or not authority is written in the electronic key 50. When the authority is written in the key 50 (S22:Yes), at S23, the date and time when the door 3 was opened and the fact that the key 50 is being lent are stored as the usage history in the external memory unit 24 in association with the authenticated ID. Accordingly, the fact that the user takes out (borrows) the electronic key 50 by proper procedures can be stored in the usage history in the external memory unit 24. The program is then reset and returned to Start, entering standby.

When the authority is not written in the electronic key 50 (S22:No), it is determined at S24 whether or not data is erased. When data is erased (S24:Yes), indicating the returning mode is running, no authority is written in the electronic key 50 and the program advances to S23 in which the date and time when the door 3 was opened and the date and time when the door 3 was closed and the fact that the electronic key 50 is returned are stored as the usage history in the external memory unit 24 in association with the authenticated ID. Accordingly, the fact that the user returned the electronic key 50 by following proper procedures can be stored in the external memory unit 24. The program is then reset and returned to Start, entering standby.

When the data is not erased (S24:No), indicating that no authority (ID and storage cabinet specifying data) is written in the electronic key 50 to enable or validate the key 50 even though the lending mode is running, a yet-to-be-writing error is indicated on the indicator 10 and a buzzer sound is generated at S25. It is accordingly possible to inform the user that no authentication is written in the electronic key 50 and thus the electronic key 50 is not a specified key assigned to the user and that the user is not permitted to improperly take out the electronic key 50. Thereafter, the program advances to S23 in which the date and time when the door 3 was opened and the fact that authority is not written in the electronic key 50 are stored as the usage history in the external memory unit 24 in association with the authenticated ID. Accordingly, the fact that the user improperly taken out the electronic key 50 in which no authority is written is stored in the external memory unit 24, so that the relevant user is brought to account in case the electronic key 50 is lost. The program is reset and returned to Start, entering standby.

(Usage Examples)

A procedure from lending to returning of an electronic key 50 is explained in detail below by exemplifying a case where a user A permitted to access to a storage cabinet 61 intends to check documents stored in the storage cabinet 61.

Until the non-contact card reader 11 reads ID or until the electronic key 50 is inserted in the data erasing unit 12, the key management box 1A continues to lock the door 3 to disallow taking-out of the electronic keys 50.

The user A takes out a specific assigned electronic key 50 from the key management box 1A according to the following procedures.

Specifically, the user A holds his/her ID card over the card reader 11 so that the card reader 11 reads ID from the ID card (S1:Yes). The CPU 21 enters the lending mode. At this time, no electronic key 50 is being lent to the user A (S2:No). Thus, the CPU 21 checks the read ID against the data stored in the memory 22 to determine whether or not the user A has the authority to use the electronic key 50 (the authority to access the target storage cabinet(s)) (S5).

When the authority is authenticated (S5:Yes), the door 3 is unlocked (S6). The user A then opens the door 3 within the "door opening set time" (S7:Yes, S8:Yes). In the main body 2 with the door 3 opened, the electronic keys 50 appear as hanging from the electronic-key holders 4. The user takes one of the electronic keys 50 hanging from the holders 4 within the "unlocking set time" and then insert the electronic key 50 in the port 7 of the data writing unit 5 so that the first and second terminals 52 and 53 of the key 50 contact with the data writing unit 5 (S11:Yes, S16:Yes). It may be arranged that the indication lamp 6 and the indication light 54 of the electronic key 50 are lighted when the data writing unit 5 properly contacts with the first and second terminals 52 and 53 of the key 50 to guide the user to easily insert the electronic key 50 in the port 7 without causing contact failures.

Since the user A takes out only one electronic key 50 in which no data is written and inserts this key 50 in the data writing unit 5, the CPU 21 writes authority (ID (personal identification information) to identify the user and storage cabinet identifying data to specify a storage cabinet(s) the user is permitted to access) in the IC chip 51 of the key 50 (S17:Yes, S18). The data writing unit 5 may be configured to blink the indication lamp 6 or the indication light 54 of the electronic key 50 while the authority is being written in the IC chip 51. This makes the user A recognize that the data is being written and prevents the user for example from erroneously pulling the key 50 from the port 7 during data writing.

When the user A confirms that data is completely written in the data writing unit 5 based on that the indication lamp 6 or the indication light 54 is turned off or others, the user A pulls the electronic key 50 from the port 7 and closes the door 3 (S20:Yes). The CPU 21 then locks the door 3 to disallow taking-out of the rest of electronic keys 50 from the main body 2 (S21). Then, the CPU 21 causes the external memory unit 24 to store the usage history of the user A which user took out the electronic key 50 (data on the date and time when the door 3 was opened, the date and time when the door 3 was closed, and the fact that the electronic key 50 is being lent, which are stored in association with the ID of the user A), and enters standby.

By the above lending operations, the electronic key 50 taken out by the user A functions as a key enabled to unlock the electronic locks 64 of the target storage cabinet 61. The user A then moves to the storage cabinet 61 with the electronic key 50 taken out from the key management box 1A.

The user A inserts the electronic key 50 in one electronic lock 64 of the storage cabinet 61. This lock 64 contacts with the first and second terminals 52 and 53 of the key 50 and then accesses the IC chip 51 to read the ID and the storage cabinet identifying data from the IC chip 51. Since the read storage cabinet identifying data indicates that the user A is permitted to access the storage cabinet 61, the lock 64 in which the key 50 is inserted performs an unlocking operation. Thus, the user A is allowed to open a door(s) of the storage cabinet 61. After checking or taking out documents stored in the storage cabinet 61, the user A closes the door(s) of the storage cabinet 61 and locks the lock or locks 64 with the key 50. The usage history of the storage cabinet 61 may be stored in the electronic key 50 and transmitted to the key management box 1A when this key 50 is returned therein or may be stored in a higher-level device from the storage cabinet 61 through a LAN.

Herein, supposing that the user A inserts the electronic key 50 in an electronic lock 64 of the storage cabinet 62 different from the storage cabinet 61 in order to open the storage cabinet 62. The IC chip 51 of the electronic key 50 does not store the storage cabinet identifying data permitting the user A to access the storage cabinet 62. Thus, even when the user A inserts the electronic key 50 in the electronic lock 64 of the storage cabinet 62, the lock 64 of the storage cabinet 62 is not unlocked. The user A is not permitted to open a door of the storage cabinet 62.

When the user A finishes necessary works for documents and others in the storage cabinet 61, the user A promptly moves back to the key management box 1A and returns the electronic key 50 therein. Since the key management box 1A stores the usage history indicating that the user A took out the electronic key 50, prompt returning of the key 50 is intended to avoid a risk of being called to account in case the key 50 is lost.

To be concrete, the user A having come to the key management box 1A inserts the electronic key 50 in the port 13 of the data erasing unit 12 so as to take the first terminal 52 and the second terminal 53 into contact with the data erasing unit 12 (S1:No, S2:Yes). Accordingly, the CPU 21 enters the returning mode. It may be arranged that displaying of the indicator

10 and lighting of the indication light 54 of the electronic key 50 inform that the first and second terminals 52 and 53 properly contact with the data erasing unit 12 to guide the user A to easily insert the electronic key 50 in the port 13 without causing contact failures.

The CPU 21 causes the data erasing unit 12 to erase the data (ID and the storage cabinet identifying data) stored in the IC chip 51 (S4). The electronic key 50 taken out by the user A returns from a specified key assigned to the user A to a blank key assignable to anyone. When the ID stored in the IC chip 51 coincides with the ID stored in the memory 22, personal authentication is successful. Thus, the CPU 21 unlocks the door 3 (S5:Yes, S6). The user A opens the door 3 within the "door opening set time" and hangs the electronic key 50 on any one of empty electronic-key holders 4 through the holder hole 55 of the key 50 to return the key 50 in the key management box 1A (S8:Yes). The user A then closes the door 3 within the "unlocking set time" (S11:Yes, S16:No, S20:Yes).

Accordingly, the CPU 21 causes the electronic lock 8 to lock the door 3, the external memory unit 24 to store the usage history (the date and time when the door 3 was opened and the date and time when the door 3 was closed, and the fact that the electronic key 50 was returned, which are stored in association with the ID of the user A) and enters standby (S21, S22:No, S24:Yes, S23).

By the above returning operation, the electronic key 50 is a key disabled to unlock the locks of any storage cabinets, i.e., a blank key available for any user.

Consequently, the key management box 1A in which the data erasing unit 12 is provided on the outside (the front side 100X) of the main body 2 uncovered by the door 3 so that the port 13 is exposed to the outside. Accordingly, the storage cabinet identifying data and the personal identification information written in the IC chip 51 of the electronic key 50 is surely erased at the time of returning and then the key 50 is returned in the holder 4. Therefore, the key management box 1A collectively manages the electronic keys 50 disabled to open any storage cabinets. If someone takes out an electronic key 50 by forcibly breaking the door 3 open, therefore, any storage cabinets cannot be opened with this electronic key 50 and hence any documents (stored objects) are not taken out. Accordingly the key management box 1A can ensure security. Since this key management box 1A includes a single data writing unit 5 and a single data erasing unit 12 which are shared by a plurality of electronic keys 50, the number of data writing units and the number of data erasing units are reduced, leading to cost reduction, as compared with a case where data writing units and data erasing units are provided individually for electronic-key holders. Furthermore, in the key management box 1A, the electronic keys 50 are hung from the electronic-key holders 4. Those holders 4 are inexpensive, leading to cost reduction.

In the key management box 1A, the data writing unit 5 provided in the key storing section 100A formed on the inside of the main body 2 is covered by the door 3. Unless ID authentication (personal authentication) is executed, the ID and the storage cabinet identifying data cannot be written in the IC chip 51 to enable the electronic key 50. This can prevent improper use of the electronic key 50.

Meanwhile, in the key management box 1A with the door 3 locked, the stored electronic keys 50 are covered by the door 3. Therefore, the electronic keys 50 cannot be taken out unless executing the ID authentication and returning the electronic key 50 are carried out (S1, S2, S3, S4, S5, and S6).

When the user A holds the ID card over the card reader 11 before returning the electronic key 50, the CPU 21 determines that the read ID is the ID of the user A who took out the electronic key 50 (on-lending) from the usage history stored in the external memory unit 24 and does not unlock the door 3 (S1:Yes, S2:Yes). In this way, the key management box 1A always permits lending of one electronic key 50 per one user, thereby preventing unauthorized taking-out and improper use of an electronic key(s) 50.

(Advantageous Effects)

The key management box 1A of the present embodiment explained above is configured to collectively store and manage the electronic keys 50 to be used by users in order to unlock the locks 64 of the storage cabinets 61, 62, and 63 placed in an office, each key 50 including the IC chip 51 to read and write data. In the key management box 1A, there are provided the main body 2 for housing the electronic keys 50, the door 3 attached in operable/closable manner to the main body 2 to cover the electronic keys 50, the opening/closing permission means (the electronic lock 8 in the present embodiment) to permit opening and closing of the door 3, the plurality of electronic-key holding means (the electronic-key holders 4A to 4I in the present embodiment) attached to the main body 2 in a section to be covered by the door 3 and to individually hold the electronic keys 50, the personal authentication means (the non-contact card reader 11 and the control substrate 20 in the present embodiment) provided on the outside of the main body 2 to read the personal identification information (ID in the present embodiment) to execute personal authentication, the data writing means (the data writing unit 5 and the control substrate 20 in the present embodiment) to write at least the ID read by the card reader 11 in the IC chip 51, the electronic-key disabling means (the data erasing unit 12 and the control substrate 20 in the present embodiment) provided on the outside of the main body 2 to disable the electronic key 50 when this means communicates with the IC chip 51 of the electronic key 50 and determines that this key 50 is a key on-lending. The key management box 1A further includes the control means (the control substrate 20 in the present embodiment) configured to determine that the lending mode is established to allow lending of the electronic key 50 when the card reader 11 reads ID, and cause the electronic lock 8 to permit opening of the door 3 and then activate the data writing unit 5, or to determine that the returning mode is established to allow returning of the electronic key 50 when the electronic key 50 is determined to be a key on-lending through communication between the data erasing unit 12 and the IC chip 51 while the card reader 11 does not read ID, and cause the electronic lock 8 to permit opening of the door 3. Consequently, the data writing unit 5 and the data erasing unit 12 can be used in common for the plurality of electronic keys 50, leading to cost reduction. Furthermore, the key management box 1A is also configured to either determine that the lending mode is established to allow lending of the electronic key 50 when the card reader 11 provided on the outside of the main body 2 reads ID, permitting opening of the door 3, so that the ID is written in the electronic key 50, or determine that the returning mode is established to allow returning of the electronic key 50 by determining that the electronic key 50 is a key on-lending through communication between the data erasing unit 12 and the IC chip 51 while the card reader 11 does not read ID, permitting opening of the door 3. After the electronic key 50 is surely disabled at the time of returning, accordingly, the electronic key 50 is returned to an empty one of the electronic-key holders 4. Security can therefore be ensured.

In the key management box 1A in the present embodiment, the data writing means is provided in the key storing section 100A formed on the inside of the main body 2 and covered by the door 3. Accordingly, unless ID authentication (personal authentication) is executed, the ID and the storage cabinet identifying data cannot be written in the IC chip 51 to enable the electronic key 50. This can prevent improper use of the electronic key 50.

The key management box 1A in the present embodiment further includes the electronic-key lending information storage means (the external memory unit 24 that stores the usage history in the present embodiment) to store the personal identification information (ID) of a user who took out the electronic key 50, and the double-lending prevention means (the CPU 21 and the program to execute the processing at S1 and S2 in FIG. 5 in the present embodiment) to inhibit the opening/closing permission means from permitting opening/closing of the door 3 when the personal identification information (ID) coincides with the personal identification information stored in the electronic-key lending information storage means. Accordingly, only one electronic key 50 can be lent to one user, thereby preventing improper use of the electronic keys 50.

The key management box 1A in the present embodiment greatly exhibits the above effects in managing a number of keys. For instance, a company or enterprise such as a cell-phone provider that treats large amounts of information is equipped with several thousands to several tens of thousands of servers. Each server is stored in lockable storage cabinets (server racks) to avoid improper access to information. In this case, a floor of the company is occupied by several thousands to several tens of thousands of the storage cabinets stacked in blocks each including about ten cabinets. Passages are provided between the blocks. Each storage cabinet is provided with doors on a front side and a back side to offer convenience for a person authorized to use a server, thereby allowing the person standing on one passage to open either the front door or the back door to access the server.

Each door of the storage cabinets is conventionally attached with a lock. A user inserts and turns a mechanical key associated in one-to-one correspondence to the lock and opens the door (the front or back door) of the target storage cabinet and accesses the server. Therefore, the mechanical keys conventionally have to be managed as much as twice the number of storage cabinets.

The large number of mechanical keys are individually stored and managed in a key management box in order to safeguard the information stored in the servers. Therefore, a troublesome job is required to check the presence/absence of the mechanical keys. A user also has to take out a mechanical key or keys from the key management box and carry the key(s) to the number corresponding to the number of servers which the user intends to access. In addition, in front of a target storage cabinet, the user has to find an intended key from among the mechanical keys to unlock the lock of the storage cabinet. This is not convenient for the user. In the case where a user carries many mechanical keys, he/she may not be aware of one or more of the mechanical keys being lost during moving until checks the number of mechanical keys to return the keys in the key management box. Thus, loss of the mechanical key(s) and other security levels degrade.

In contrast, in the case where the keys of the storage cabinets for servers are managed by the key management box 1A of the present embodiment, the doors of the server storage cabinets are attached with the electronic locks each being locked and unlocked based on ID data and storage cabinet identifying data stored in the IC chips 51 of the electronic keys 50. The electronic keys 50 stored in the main body 2 of the key management box 1A do not contain any data in the IC chip 51. Even if taken out improperly, every electronic key 50 cannot open/close any storage cabinets.

When a user having proper authority is successfully authenticated, the key management box 1A writes the ID data and identifying data on one storage cabinet or two or more storage cabinets in the IC chip 51 of the electronic key 50 inserted in the data writing unit 5. Accordingly, this key 50 functions as a special key to the user. Using this key 50, the user is allowed to open/close the door(s) of the storage cabinet(s) corresponding to the storage cabinet identifying data stored in the IC chip 51 and access the server(s) housed in the storage cabinet(s). Even when the user intends to access a number of servers, the user has only to carry one electronic key taken out from the key management box 1A and, conveniently, can open the doors of the target storage cabinets with one key 50. Since the user has only to carry one electronic key 50, this key 50 is less likely to be lost, resulting in enhanced security level.

After the access to the server(s), the user is sure to insert the electronic key 50 in the data erasing unit 12 to erase the data stored in the key 50, and then returns the key 50 in the key management box 1A. In this way, the electronic key 50 returned is a blank key assignable to anyone. It is therefore only necessary to provide the electronic keys 50 to the minimum number to allow users having access to servers to share the electronic keys 50. As a result, the number of electronic keys 50 managed by the key management box 1A can be reduced greatly than the number of conventional mechanical keys, thereby facilitating the management of the electronic keys 50. The presence/absence of the electronic keys 50 can also easily be checked, resulting in enhanced security level.

<Second Embodiment>

A second embodiment of the invention will be described below.

(Schematic Configuration of Key Management Box)

Figure 7:
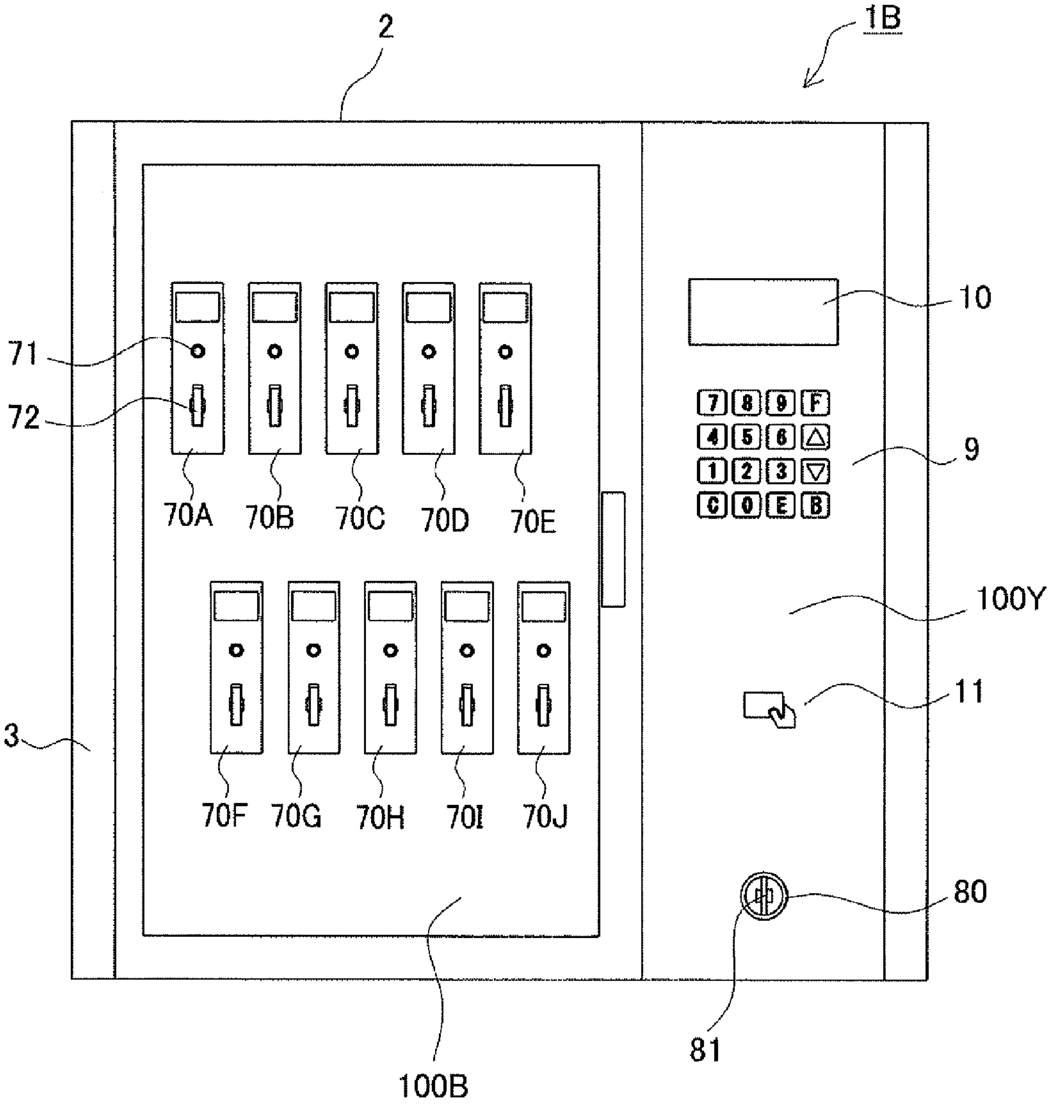
FIG. 7 is a front view of a main body of a key management box in a second embodiment of the invention.

FIG. 7 is a front view of a main body 2 of a key management box 1B in the second embodiment, in which the door 3 is in an open state.

The key management box 1B in the second embodiment differs from the key management box 1A in the first embodiment in that a Read/Write unit 80 is provided to read and write data in an electronic key 50 and that electronic-key presence detecting means 75 is provided to detect the presence/absence of the electronic key(s) 50. The following explanation is therefore made with a focus on the differences from the first embodiment. Identical or similar parts to those in the first embodiment are not repeatedly described.

As shown in FIG. 7, the key management box 1B is configured such that ten electronic-key holder units (one example of the electronic-key holding means) 70A to 70J are arranged in a key storing section 100B formed on the inside of the main body 2. Each of the holder units 70A to 70J includes an insert port 72 in which an electronic key 50 is inserted and an indication lamp 71 to indicate whether or not the electronic key 50 is permitted to be removed from the port 72. The holder units 70A to 70J are arranged so that their ports 72 and lamps 71 are exposed on the inside (the key storing section 100B) of the main body 2. Each holder unit 70A to 70J contains a built-in lock unit 74 (see FIG. 8) to lock the electronic key 50 inserted in the port 72.

On the outside (a front side 100Y) of the main body 2 uncovered by the door 3, the Read/Write unit 80 is provided with an insert port 81 exposed to the outside, in which an electronic key 50 is to be inserted.

(Electrical Block Configuration)

Figure 8:
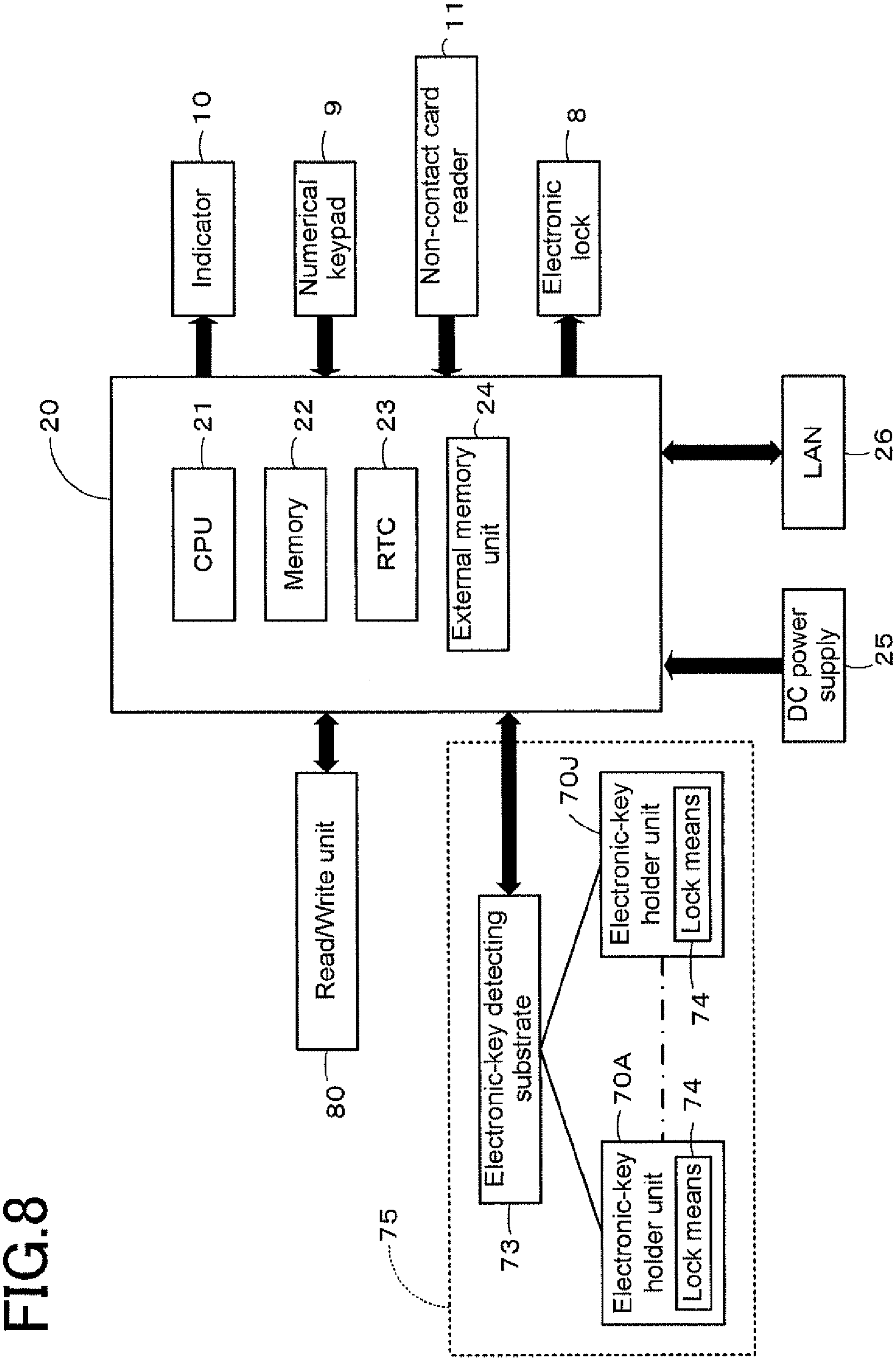
FIG. 8 is an electrical block diagram of the key management box in the second embodiment.

FIG. 8 is an electrical block diagram of the key management box 1B. The control substrate 20 of the key management box 1B is connected, different from that in the first embodiment, to the Read/Write unit 80 and an electronic-key detecting substrate 73 of the electronic-key presence detecting means 75. The electronic-key detecting substrate 73 is electrically connected to the holder units 70A to 70J. The substrate 73 detects the presence/absence of each electronic key 50 based on whether or not electric current passes through the contact IC chip 51 of each key 50 when electric current is supplied to the holder units 70A to 70J, and then transmits detection signal(s) to the CPU 21.

The CPU 21 of the control substrate 20 accesses the lock means 74 of each holder unit 70A to 70B through the electronic-key detecting substrate 73 and controls locking and unlocking operations of each lock means 74.

(Opening/Closing Control and Key Presence Detecting Operation of Key Management Box)

Figure 9:
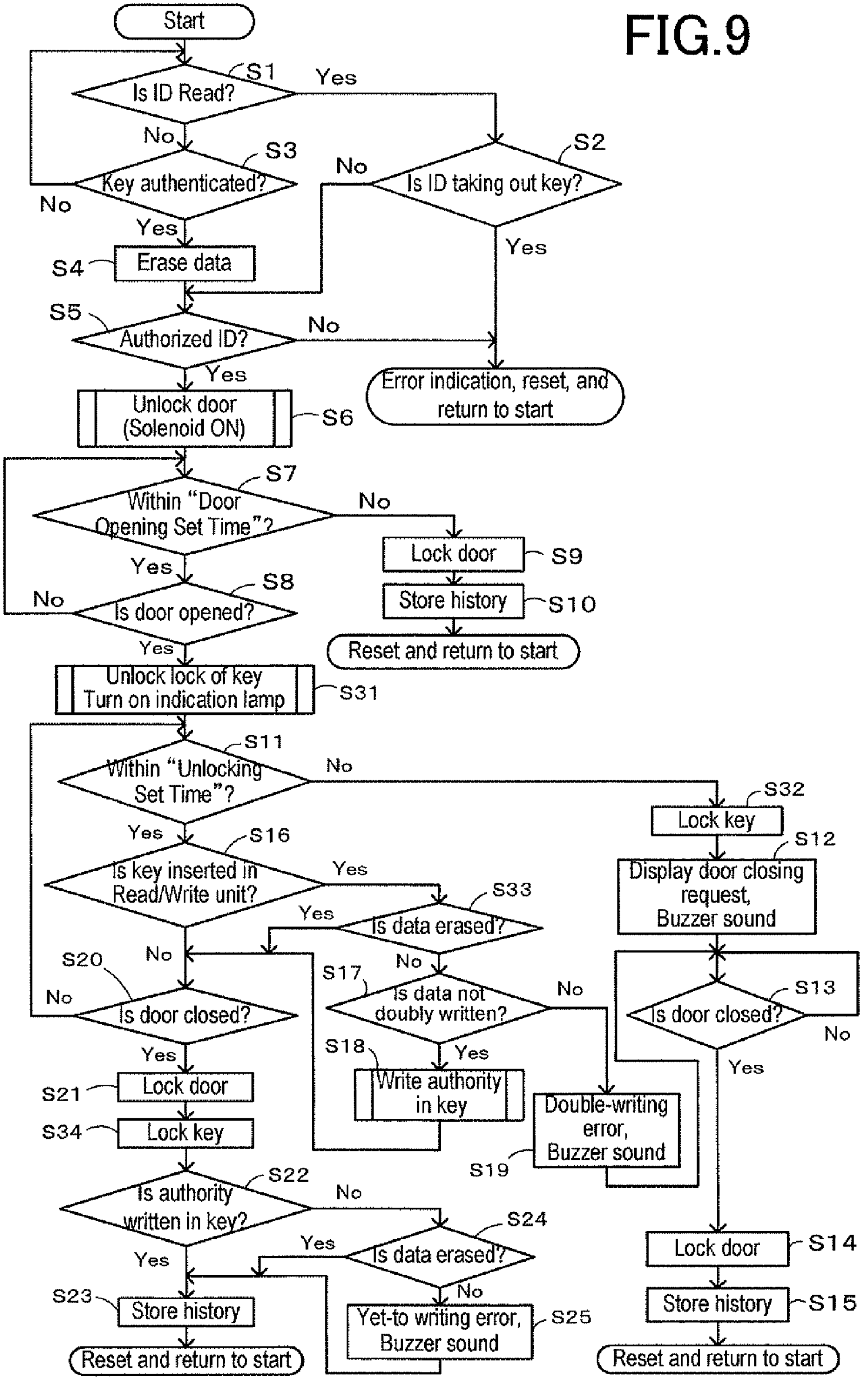
FIG. 9 is a flowchart showing opening/closing control operations and key presence detecting operations of the key management box in the second embodiment.

FIG. 9 is a flowchart showing opening/closing control and key presence detecting operation to be executed in the key management box 1B. After the door 3 is opened within the "door opening set time" (S8:Yes, S31), the CPU 21 causes the lock means 74 of one of the holder units 70 holding the electronic keys 50 to unlock, thereby enabling the relevant key 50 to be removed. At that time, the indication lamp 71 of the holder unit 70 unlocked by the lock means 74 is turned on to inform a user where the key 50 permitted to be removed is present.

After the "unlocking set time" has passed (S11:No), the CPU 21 causes the lock means 74 of each holder unit 70 to lock, thereby locking each electronic key 50. Thus, the keys 50 are not allowed to be removed improperly even while the door 3 is opened.

The CPU 21 causes a single Read/Write unit 80 to write or erase data in or from an electronic key 50. When the CPU 21 detects the key 50 being inserted in the Read/Write unit 80 (S16:Yes), if data is erased (S33; Yes), indicating the returning mode is running, the CPU 21 detects whether or not the door 3 is closed (S20). On the other hand, if data is not erased (S33:No), indicating the lending mode is running, the CPU 21 writes authority in the electronic key 50 (S17:Yes, S18) and then detects whether or not the door 3 is closed (S20).

After the door 3 is closed and locked (S21), the CPU 21 causes the lock means 74 to lock the electronic keys 50 (S34). The key management box 1B locks each of the electronic keys 50 collectively managed on the inside of the main body 2 to restrict removal of the keys 50 to thereby prevent improper taking-out of the keys 50.

(Lending of Electronic Keys)

Lending the electronic key 50 is explained below.

If a user intends to take out (borrow) an electronic key 50 from the key management box 1B, the user holds his/her ID card over the non-contact card reader 11. When the card reader 11 reads the ID from the ID card, the CPU 21 determines that the lending mode to allow lending of the key 50 is entered and thus carries out personal authentication based on the read ID. If the personal authentication is successfully executed, the CPU 21 causes the electronic lock 8 to unlock the door 3 (S1:Yes, S2:No, S5:Yes, S6). In the electronic-key holder unit 70 with the lamp 71 lighting, the lock means 74 unlocks the electronic key 50. Therefore, the user removes the key 50 from the holder unit 70 with the lamp 71 lighting. While the door 3 remains open, the user inserts the insert port 81 of the Read/Write unit 80 (S7:Yes, S8:Yes, S31, S11:Yes, S16:Yes).

Then, the CPU 21 causes the Read/Write unit 80 to write, in the IC chip 51 of the inserted key 50, the ID used for authentication and storage cabinet identifying data to specify the storage cabinet an ID authenticated user is permitted to access (S33:No, S17:Yes, S18), When the user closes the door 3, the CPU 21 locks the door 3 and stores the usage history (data on the date and time when the door 3 was opened, the date and time when the door 3 was closed, and the fact that the relevant key 50 is being lent, which are stored in association with the authenticated ID) in the external memory unit 24 (S20:Yes, S21, S34, S22:Yes, S23). Thereafter, the key management box 1B enters standby.

(Returning of Electronic Key)

Returning the electronic key 50 is explained below.

If a user intends to return an electronic key 50 in the key management box 1B, the user inserts the key 50 in the insert port 81 of the Read/Write unit 80 (S1:No, S3:Yes). The CPU 21 determines the returning mode is entered to allow returning of the electronic key 50, and erases the data from the IC chip 51 of the inserted key 50 to disable the key 50 (S4). When the personal authentication is successfully executed based on the ID read from the key 50, the CPU 21 unlocks the door 3 (S5:Yes, S6). When the user opens the door 3, the indication lamp 71 of the electronic-key holder unit 70 unlocked by the lock means 74 is lighting. The user thus removes the relevant key 50 from the Read/Write unit 80 and inserts this key 50 in the insert port 72 of the holder unit 70 with the lamp 71 lighting (S7:Yes, S8:Yes, S31). At that time, the indication light 54 of the key 50 may be turned on upon normal insertion of the key 50, thereby allowing the user to easily insert the key 50 in the port 72 without causing contact failures.

When the user closes the door 3, thereafter, the CPU 21 locks the door 3 and causes the lock means 74 to lock the electronic key 50. The CPU 21 then stores the usage history (data on the date and time when the door 3 was opened, the date and time when the door 3 was closed, and the fact that the electronic key 50 was returned, which are stored in association with the authenticated ID) in the external memory unit 24 (S11:Yes, S16:Yes, S33:Yes, S20:Yes, S21, S34, S22:No, S24:Yes, S23) and then enters standby.

The key management box 1B is configured such that the electronic-key presence detecting means 75 detects the presence/absence of the electronic keys 50. To be concrete, the CPU 21 supplies electric current to the electronic-key holder units 70A to 70J through the electronic-key detecting substrate 73 and reads a serial number from the IC chip 51 of each key 50. Thus, the CPU 21 can detect which of the holder units 70A to 70J hold the electronic key(s) 50 and also the number of the electronic keys 50 currently present. This detection result is stored in the external memory unit 24. Accordingly, in case the electronic key 50 is lost, it is possible to automatically determine who opened and closed the key management box 1B before the electronic key 50 was lost by following the data stored in the external memory unit 24. High security level is thus achieved.

The CPU 21 stores the usage history of each electronic key 50 in the external memory unit 24 and monitors how many electronic keys 50 are currently on-lending. Specifically, the CPU 21 determines whether or not the number of keys 50 detected by the electronic-key presence detecting means 75 is different from the number (a value) obtained by subtracting the number of the keys 50 on-lending from the total number of the keys 50 collectively managed. If those numbers are different, the CPU 21 displays an error indication on the indicator 10 or generates a buzzer sound to issues an alert. In other words, the CPU 21 continuously monitors whether or not the number of the electronic keys 50 detected by the electronic-key presence detecting means 75 coincides with the number of the electronic keys 50 on-lending stored in the external memory unit 24 and, if inconsistency is detected, issues an alert. When an administrator of the key management box 1B finds the alert, he/she follows the data in the external memory unit 24 to ascertain when and who opened the door 3 before abnormality occurred in the electronic key 50, and calls that user to account for.

The presence/absence of the electronic keys 50 can be performed once per day (for example, at the beginning of business day or at the end of business day) or every time the door 3 is opened and closed. No particular limitations are given to the number and the time of such detecting operations.

(Advantageous Effects)

As explained above, the key management box 1B of the second embodiment is configured to collectively store and manage the electronic keys 50 to be used by users to unlock the locks 64 of the storage cabinets 61-63 located in an office, each key 50 including the IC chip 51 to read and write data therein. In this box 1B, there are provided the main body 2 for housing the electronic keys 50, the door 3 attached in openable/closable manner to the main body 2 to cover the electronic keys 50, the opening/closing permission means (the electronic lock 8 in the present embodiment) to permit opening and closing of the door 3, the plurality of electronic-key holding means (the electronic-key holder units 70A-70J in the present embodiment) attached to the main body 2 in a section to be covered by the door 3 and to individually hold the electronic keys 50, the personal authentication means (the non-contact card reader 11 and the control substrate 20 in the present embodiment) provided on the outside of the main body 2 to read the personal identification information (ID in the present embodiment) to execute personal authentication, the data writing means (the Read/Write unit 80 and the control substrate 20 in the present embodiment) to write at least the personal identification information (ID) read by the personal authentication means in the IC chip 51, the electronic-key disabling means (the Read/Write unit 80 and the control substrate 20 in the present embodiment) provided on the outside of the main body 2 to disable the electronic key 50 when this means communicates the IC chip 51 of the key 50 and determines that this key 50 is a key on-lending. The key management box 1B further includes the control means (the control substrate 20 in the present embodiment) configured to determine that the lending mode is established to allow lending of the electronic key 50 when the card reader 11 reads ID, and cause the electronic lock 8 to permit opening and closing of the door 3 and then activate the Read/Write unit 80, or to determine that the returning mode is established to allow returning of the electronic key 50 when the electronic key 50 is determined to be a key on-lending through communication between the Read/Write unit 80 and the IC chip 51 while the card reader 11 does not read ID, and cause the electronic lock 8 to permit opening of the door 3. Consequently, the Read/Write unit 80 can be used in common for the plurality of electronic keys 50, leading to cost reduction. Furthermore, the key management box 1B is also configured to either determine that the lending mode is established to allow lending of the electronic key 50 when the card reader 11 provided on the outside of the main body 2 reads ID, permitting opening of the door 3, so that the ID is written in the electronic key 50, or determine that the returning mode is established to allow returning of the electronic key 50 by determining the electronic key 50 is a key on-lending through communication between the Read/Write unit 80 and the IC chip 51 of the electronic key 50 while the card reader 11 does not read ID, permitting opening of the door 3. Thus, after the electronic key 50 is surely disabled at the time of returning, the electronic key 50 is returned to one of the holder units 70A to 70J. Security can therefore be ensured.

In the key management box 1B in the second embodiment, the Read/Write unit 80 is provided on the outside of the main body 2, so that a control circuit for data writing and a control circuit for disabling the electronic key 50 can be provided as a common configuration or arranged close to each other, achieving a compact size.

The key management box 1B in the second embodiment further includes the electronic-key presence detecting means 75 (the electronic-key detecting substrate 73 and the electronic-key holder units 70 in the present embodiment) to detect the presence/absence of the electronic keys 50. Accordingly, the presence/absence of the electronic keys 50 is automatically monitored to promptly detect any defects, e.g., improper taking-out of the electronic key(s) 50.

The key management box 1B in the second embodiment further includes the alarm means (the CPU 21, the indicator 10, and a buzzer in the present embodiment) to issue an alert when the number of the electronic keys 50 detected by the electronic-key presence detecting means 75 is different from the number obtained by subtracting the number of the electronic keys 50 on-lending from the total number of electronic keys 50 collectively managed. This alerts an administrator of the key management box 1B to promptly be aware of abnormality in the electronic key 50.

The present invention is not limited to the above embodiments and may be embodied in other specific forms without departing from the essential characteristics thereof.

(1) For instance, in the above embodiments, the personal authentication is carried out by use of the ID card, but may be performed by biometric identity verification using finger vein, retina, or face. As another alternative, a contact ID card or a magnetic card that stores ID may be used for the personal authentication.

(2) For instance, at the time of lending the electronic key 50, "valid-time data" defining the valid time during which the electronic key 50 is valid or enabled and "data on the limited number of times for use" defining the number of times the electronic key 50 is permitted to be used may be stored together with the ID and the storage cabinet identifying data in the IC chip 51 of the electronic key 50. In this case, even if a user loses the electronic key 50, this key 50 no longer functions as a key (the key 50 is disabled) after the valid time has passed or the electronic key 50 is used in a predetermined number of times. Thus, security level of the electronic key management can be raised.

(3) In the second embodiment, for example, the Read/Write unit 80 for writing/erasing data in/from the electronic key 50 is provided on the outside of the main body 2. As an alternative, a data writing unit and a data erasing unit may be provided separately on the outside of the main body 2.

(4) In the above embodiments, for example, the storage cabinet identifying data that designates all the storage cabinets to which a user has access right is stored in the IC chip 51. An alternative is to make a user enter data (a code or the like) of a storage cabinet the user intends to use by use of the numerical pad 9 and, if the user has the authority to access the intended storage cabinet, store the storage cabinet identifying data that designates the storage cabinet in the IC chip 51. In this case, the access authority to open and close only the storage cabinet requested by the user is written in the electronic key 50 for validation. This electronic key 50 is not assigned with authority to open and close other storage cabinets which the user has access authority to but does not request opening/closing thereof. Therefore, security level can further enhanced.

(5) In the above embodiments, the electronic key 50 includes the IC chip 51 connected to the first terminal 52 and the second terminal 53. The number of contact terminals connected to the IC chip 51 is not limited to two, but may be one or three or more. The key management box also may be configured to manage electronic keys including non-contact IC chips from/on which data is readable/writable. In this case, the data writing means and the electronic-key disabling means of the key management box is adapted to write data and disable an electronic key through communication with the non-contact IC chip when the electronic key comes near the key management box.

(6) In the above embodiments, the data is erased from the IC chip 51 to disable the electronic key 50. As alternative, electronic-key disabling means for disabling an electronic key by writing invalid data in the IC chip 51 may be provided on the outside of the main body 2 of the key management box 1A or 1B.

(7) In the above embodiments, for the purpose of preventing a user from taking out two or more electronic keys 50 while the door 3 is opened, double-writing the authority to the electronic key 50 is not permitted (see S17 in FIGS. 5 and 9). An alternative is to stop the writing means once one operation to prevent a user from taking out a plurality of validated or authorized electronic keys 50 while the door 3 is opened.

(8) In the above embodiments, the data writing unit 5 and the Read/Write unit 80 directly write the ID read by the card reader 11 in the contact IC chip 51 of the electronic key 50 as information to specify personal identification information read by the card reader 11 to identify a user. As an alternative, for example, the data writing unit 5 and the Read/Write unit 80 may be configured to table convert finger vein information read by the personal authentication means to information easy to use (information to identify a person by specifying the finger vein information) in the case where the personal authentication means reads the finger vein (one example of the personal identification information) for personal authentication, and write this information in the IC chip 51. Specifically, the data writing unit 5 and the Read/Write unit 80 may be arranged to write the information in different form from the personal identification information read by the personal authentication means in the electronic key 50 to validate or enable the key 50.

(9) In the above embodiments, the electronic key 50 is disabled and then the door 3 is unlocked. Invalidating of the electronic key 50 and unlocking of the door 3 may be performed simultaneously or the electronic key 50 may be disabled after the door 3 is unlocked and opened.

While the presently preferred embodiment of the present invention has been shown and described, it is to be understood that this disclosure is for the purpose of illustration and that various changes and modifications may be made without departing from the scope of the invention as set forth in the appended claims.

Reference Signs List

1A, 1B Key management box
2 Main body
3 Door
4 Electronic-key holder
5 Data writing unit
8 Electronic lock
10 Indicator
11 Non-contact card reader
12 Data erasing unit
21 CPU
22 Memory
24 External storage unit
50 Electronic key
51 Contact IC chip
52, 53 First terminal and Second terminal
70 Electronic-key holder unit
75 Electronic-key presence detecting means
80 Read/Write unit

The invention claimed is:

1. A key management box for collectively storing and managing electronic keys each including an IC chip from/on which data is readable/writable, each electronic key being to be used by a user to unlock one or more locks of storage cabinets placed in an office, the key management box comprising:

a main body for housing the electronic keys;

a door attached in openable and closable manner to the main body to cover the electronic keys;

opening/closing permission means for locking the door;

a plurality of electronic-key holding means attached to the main body and covered by the door and configured to individually hold the electronic keys;

personal authentication means provided on an outside of the main body and configured to perform personal authentication based on personal identification information input to the personal authentication means;

data writing means configured to write, in the IC chip, authority information including at least the personal identification information input to the personal authentication means and storage cabinet identifying data to specify one storage cabinet or two or more storage cabinets accessible to the user, out of the storage cabinets;

electronic-key disabling means provided on the outside of the main body and configured to communicate with the IC chip of one of the electronic keys, the electronic-key disabling means being configured to erase the authority information from the IC chip to disable the one electronic key when the electronic-key disabling means reads the authority information from the IC chip; and control means configured to determine that a lending mode is established to allow lending of the electronic key when the personal authentication means successfully executes the personal authentication, and cause the opening/closing permission means to unlock the door and then activate the data writing means to write the authority information in one of the electronic keys, or to determine that a returning mode is established to allow returning of the electronic key when the electronic-key disabling means erases the authority information from the electronic key and disables the electronic key while the personal authentication means does not read the personal identification information, and cause the opening/closing permission means to permit unlocking of the door.

2. The key management box according to claim 1, wherein the data writing means is provided on an inside of the main body to be covered by the door.

3. The key management box according to claim 2, further including:

electronic-key lending information storage means for storing personal identification information included in the authority information written in the IC chip by the data writing means when the lending mode is executed; and double-lending prevention means for inhibiting the opening/closing permission means from unlocking of the door when the input personal identification information coincides with personal identification information stored in the electronic-key lending information storage means when the personal identification information is input in the personal authentication means while the door is locked by the opening/closing permission means.

4. The key management box according to claim 3, further including electronic-key detecting means for detecting the electronic key held in the electronic-key holding means.

5. The key management box according to claim 4, further including alarm means for issuing an alert when the number of electronic keys detected by the electronic-key detecting means is different from the number obtained by subtracting the number of electronic keys on-lending from the total number of electronic keys collectively managed.

6. The key management box according to claim 2, further including electronic-key detecting means for detecting the electronic key held in the electronic-key holding means.

7. The key management box according to claim 6, further including alarm means for issuing an alert when the number of electronic keys detected by the electronic-key detecting means is different from the number obtained by subtracting the number of electronic keys on-lending from the total number of electronic keys collectively managed.

8. The key management box according to claim 1, wherein the data writing means is provided on the outside of the main body.

9. The key management box according to claim 8, further including:

electronic-key lending information storage means for storing personal identification information included in the authority information written in the IC chip by the data writing means when the lending mode is executed; and double-lending prevention means for inhibiting the opening/closing permission means from unlocking of the door when the input personal identification information coincides with personal identification information stored in the electronic-key lending information storage means when the personal identification information is input in the personal authentication means while the door is locked by the opening/closing permission means.

10. The key management box according to claim 9, further including electronic-key detecting means for detecting the electronic key held in the electronic-key holding means.

11. The key management box according to claim 10, further including alarm means for issuing an alert when the number of electronic keys detected by the electronic-key detecting means is different from the number obtained by subtracting the number of electronic keys on-lending from the total number of electronic keys collectively managed.

12. The key management box according to claim 8, further including electronic-key detecting means for detecting the electronic key held in the electronic-key holding means.

13. The key management box according to claim 12, further including alarm means for issuing an alert when the number of electronic keys detected by the electronic-key detecting means is different from the number obtained by subtracting the number of electronic keys on-lending from the total number of electronic keys collectively managed.

14. The key management box according to claim 1, further including:

electronic-key lending information storage means for storing personal identification information included in the authority information written in the IC chip by the date writing means when the lending mode is executed; and double-lending prevention means for inhibiting the opening/closing permission means from unlocking the door when the input personal identification information coincides with personal identification information stored in the electronic-key lending information storage means when the personal identification information is input in the personal authentication means while the door is locked by the opening/closing permission means.

15. The key management box according to claim 14, further including electronic-key detecting means for detecting the electronic key held in the electronic-key holding means.

16. The key management box according to claim 15, further including alarm means for issuing an alert when the number of electronic keys detected by the electronic-key detecting means is different from the number obtained by subtracting the number of electronic keys on-lending from the total number of electronic keys collectively managed.

17. The key management box according to claim 1, further including electronic-key detecting means for detecting the electronic key held in the electronic-key holding means.

18. The key management box according to claim 17, further including alarm means for issuing an alert when the number of electronic keys detected by the electronic-key detecting means is different from the number obtained by subtracting the number of electronic keys on-lending from the total number of electronic keys collectively managed.

* * * * *